US009219744B2

(12) United States Patent
Baliga et al.

(10) Patent No.: US 9,219,744 B2
(45) Date of Patent: Dec. 22, 2015

(54) MOBILE BOTNET MITIGATION

(75) Inventors: Arati Baliga, Panaji (IN); Baris Coskun, Brooklyn, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 670 days.

(21) Appl. No.: 12/962,940

(22) Filed: Dec. 8, 2010

(65) Prior Publication Data
US 2012/0151033 A1 Jun. 14, 2012

(51) Int. Cl.
| G06F 15/173 | (2006.01) |
| G06F 15/16 | (2006.01) |
| H04L 29/06 | (2006.01) |
| H04W 12/12 | (2009.01) |

(52) U.S. Cl.
CPC ........ H04L 63/1425 (2013.01); H04L 63/1441 (2013.01); H04W 12/12 (2013.01); *H04L 2463/144* (2013.01)

(58) Field of Classification Search
CPC .................... H04L 2463/144; H04L 63/1441; H04L 63/1408; H04L 63/1425
USPC .................................. 709/204–207, 224–225
See application file for complete search history.

(56) References Cited

U.S. PATENT DOCUMENTS

| 8,069,210 | B2* | 11/2011 | Gillum et al. ................. 709/206 |
| 8,260,914 | B1* | 9/2012 | Ranjan ........................... 709/224 |
| 8,290,470 | B2* | 10/2012 | Ray et al. .................. 455/404.2 |
| 2003/0148754 | A1* | 8/2003 | Ranta ............................ 455/411 |
| 2006/0089160 | A1* | 4/2006 | Othmer ......................... 455/457 |
| 2007/0107059 | A1* | 5/2007 | Chasin et al. ................... 726/23 |
| 2007/0116224 | A1* | 5/2007 | Burke et al. ............. 379/201.12 |
| 2008/0028463 | A1* | 1/2008 | Dagon et al. .................... 726/22 |
| 2008/0225806 | A1* | 9/2008 | Arian et al. .................... 370/338 |
| 2009/0254989 | A1* | 10/2009 | Achan et al. .................... 726/22 |
| 2011/0047620 | A1* | 2/2011 | Mahaffey et al. ............... 726/23 |
| 2011/0314542 | A1* | 12/2011 | Viswanathan et al. .......... 726/23 |

* cited by examiner

Primary Examiner — Minh-Chau Nguyen
(74) Attorney, Agent, or Firm — Amin, Turocy & Watson, LLP

(57) ABSTRACT

Mitigation of bot networks in wireless networks and/or on mobile devices is provided. A botnet detection component is provided that inspects data traffic and data flows on the wireless network to identify mobile devices that are suspected of behaving as bots. A traffic profile of the suspected bot behavior can be generated and forwarded to the mobile devices that are suspected of behaving as bots. The mobile device can correlate data traffic on the device to the traffic profile in order to identify applications responsible for the suspected bot behavior, and remove the identified applications.

20 Claims, 16 Drawing Sheets

MOBILE BOTNET MITIGATION

TECHNICAL FIELD

The subject disclosure relates to mobile communications and, more particularly, to the mitigation of bot networks (botnets) in wireless communication systems and/or on mobile communication devices.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

Technological advances have provided significant increases in the computing power and networking capabilities of mobile devices. For instance, a number of smart phones and personal digital assistants (PDA) currently run full-fledged operating systems, employ powerful processors, and have broadband connectivity to the internet that rivals desktop computers and laptops. The technical capabilities of these devices have made them appealing to professionals, students, and casuals users alike. Resulting in a large user base that is non-technical in nature, and has little understanding of digital security threats. These aspects make the ever more powerful mobile devices an attractive target for cyber criminals.

In particular, botnets in mobile devices are a growing concern for mobile device users and wireless network administrators. Since these devices are ubiquitous and are expected to outnumber personal computers in the near future, they are high-value targets for cyber criminals intending to control, own and rent them for cyber criminal activities. A compromised mobile device under the control of a botnet can cause serious issues for both the user and the associated communication infrastructure. A bot program on a mobile device can transmit spam messages over the wireless network, make expensive international calls, or send text messages to premium numbers without the user's knowledge or permission. Accordingly, it would be desirable to implement techniques for effectively mitigating botnets in mobile devices and wireless communication systems.

SUMMARY

The following presents a simplified summary of the disclosure in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems and methods are provided for the mitigation of mobile bot networks. A botnet detection engine can analyze data traffic and data flows on a network, and employ a plurality of techniques to identify devices that are suspected of behaving as bots. The botnet detection engine can generate a traffic profile of the suspected bot behavior, and forward the traffic profile to the device that is suspected of behaving as a bot. Upon receipt of the traffic profile, the device can correlate data traffic on the device to the traffic profile in order to identify one or more applications on the device responsible for the suspected bot behavior. The device can remove the applications, or take other mitigating actions, such as selectively dropping data packets generated by the applications.

In accordance with one aspect, a method is provided for botnet mitigation in a wireless network that includes the steps of analyzing data traffic in the wireless network, detecting at least one device, operable on the wireless network, that is engaging in bot behavior, generating a profile for the bot behavior, and communicating the profile to the at least one device that is engaging in the bot behavior.

In accordance with another aspect, a system is provided that includes an analysis component configured to monitor data flows in a network, and identify at least one device exhibiting bot behavior, a profile generation component configured to produce a traffic profile of the bot behavior, and an alert component configured to send the traffic profile of the bot behavior to the at least one device exhibiting the bot behavior.

In accordance with yet another aspect, a communications device is provided that includes an information acquisition component configured to obtain at least one profile of bot behavior occurring on the communications device, a detection component configured to inspect data traffic on the communications device, and configured to compare the data traffic to the at least one profile of bot behavior, and a protection component configured to at least one of: erase at least one application from the communications device identified as generating the data traffic correlating to the at least one profile of bot behavior, or perform automatic mitigation including at least one of selectively dropping at least one data packet generated via the at least one application, quarantining the at least one application, or blocking user access to the at least one application.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
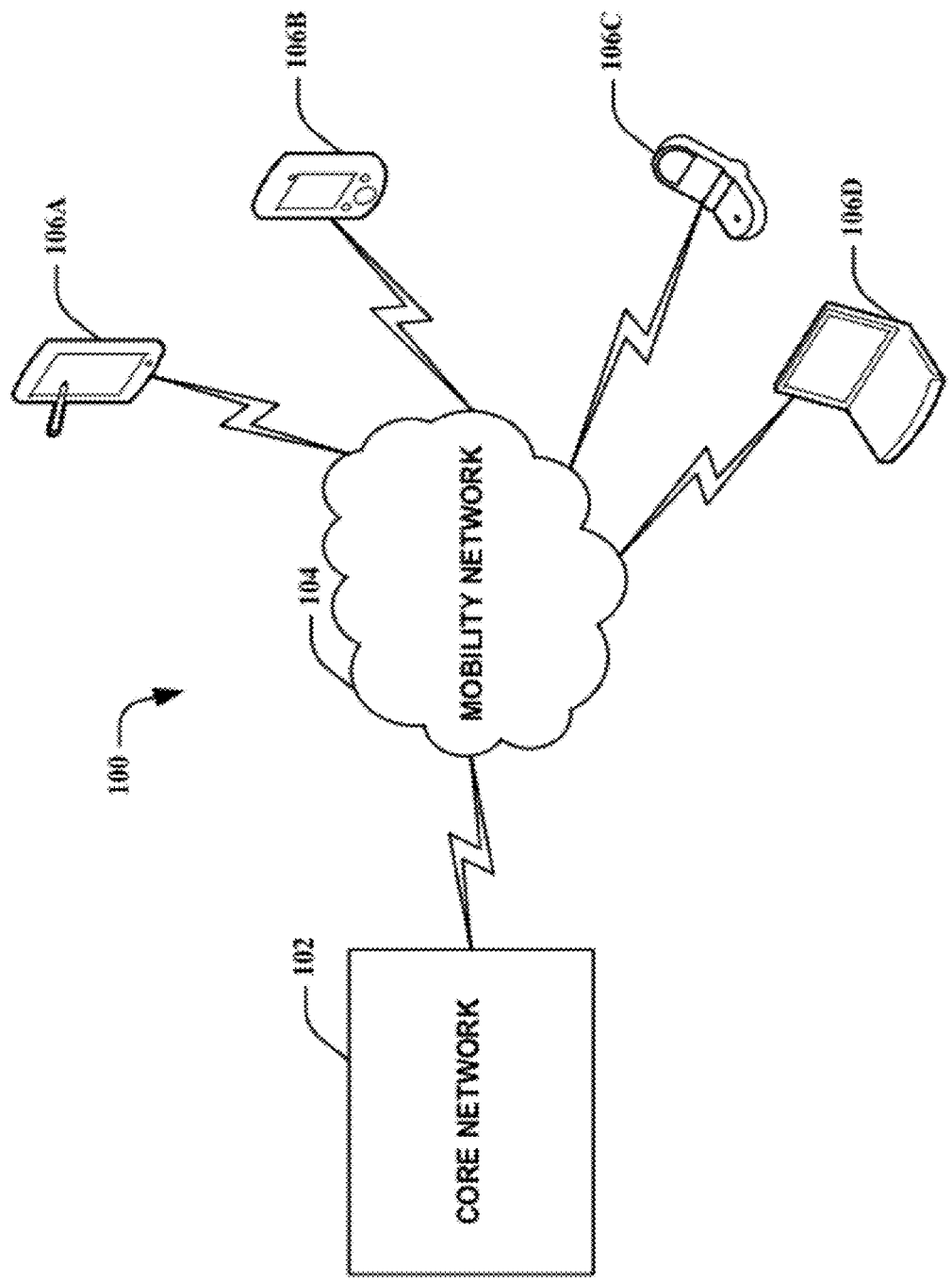
FIG. 1 illustrates an example communications network in accordance with various aspects described herein.

The subject disclosure is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "mobile device," "wireless device," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data (e.g., content or directives) and signaling streams can be packetized or frame-based flows.

Furthermore, the terms "user," "subscriber," "customer," "consumer," "agent," and the like are employed interchangeably throughout the subject specification, unless context warrants particular distinctions among the terms. It should be appreciated that such terms can refer to human entities or automated components supported through artificial intelligence (e.g., a capacity to make inferences based on complex mathematical formalisms) which can provide simulated vision, sound recognition, and so forth.

FIG. 1 illustrates an example network 100 in accordance with various aspects described herein. The network 100 includes a core network 102, a mobility network 104, and a plurality of mobile devices 106. The core network 102 can have a plurality functions including, but not limited to, session management, and transport for data packets in the network 100. The core network 102 is also referred to as the backbone network, in part, because it connects the mobility network to the Internet. For example, the core network 102 can be comprised of a wired internet protocol (IP) network where both wired traffic and wireless or mobility traffic traversing the internet flows. Virtually all data transacted on the mobility network 104 (e.g., data flows, data traffic) will flow through the core network 102.

The mobility network 104 can have a plurality of functions including, but not limited to, enabling access to the network 100 by the mobile devices 106, allocating network resources (e.g., internet protocol addresses, etc.) to the mobile devices 106, handling traffic/signaling between the mobile devices 106 and the core network 102, providing mobility management, and so forth. Mobility management can include, but is not limited to, tracking the location of the mobile devices 106, and enabling: calling; text messaging (e.g., SMS); multimedia messaging (e.g., MMS); internet service and browsing; and other mobile services to be provided to the mobile devices 106. The mobility network 104 can include a plurality of base stations or access points (not shown) that enable the mobile devices 106 to communicate with a plurality of devices on the Internet, wherein the traffic is carried by the core network 102.

The mobile devices 106 can include, but are not limited to, tablet computers, smart phones, mobile phones, netbooks, portable music players, personal digital assistants (PDAs), laptops, electronic book devices, global positioning systems (GPS), and so forth. For example, FIG. 1 illustrates the network 100 containing a plurality of mobile devices, including a tablet computer 106A, a smart phone 106B, a mobile phone 106C, and a netbook 106*d* connected to the mobility network 104. The mobile devices 106 can use the network 100 to access the internet, send/receive text messages, send/receive multimedia messages, execute voice calls, download applications, and so forth. The enhanced connectivity and technical capabilities of mobile devices 106 can leave them vulnerable to malicious software (malware), including malicious bots controlled by cyber criminals. For example, mobile devices 106 can receive a text messages that exploit one or more vulnerabilities in the operating system of the mobile devices 106 to install malware, access a website that installs malware on the mobile devices 106, access an electronic mail (email) link that installs malware on the mobile devices 106, or download a program/application that appears to be harmless (e.g., a video game), but is in fact malware. The malware can integrate compromised mobile devices 106 into a botnet, wherein the malware interacts with other compromised devices to form a small network, so that they can attack targets cooperatively (discussed below).

Figure 2:
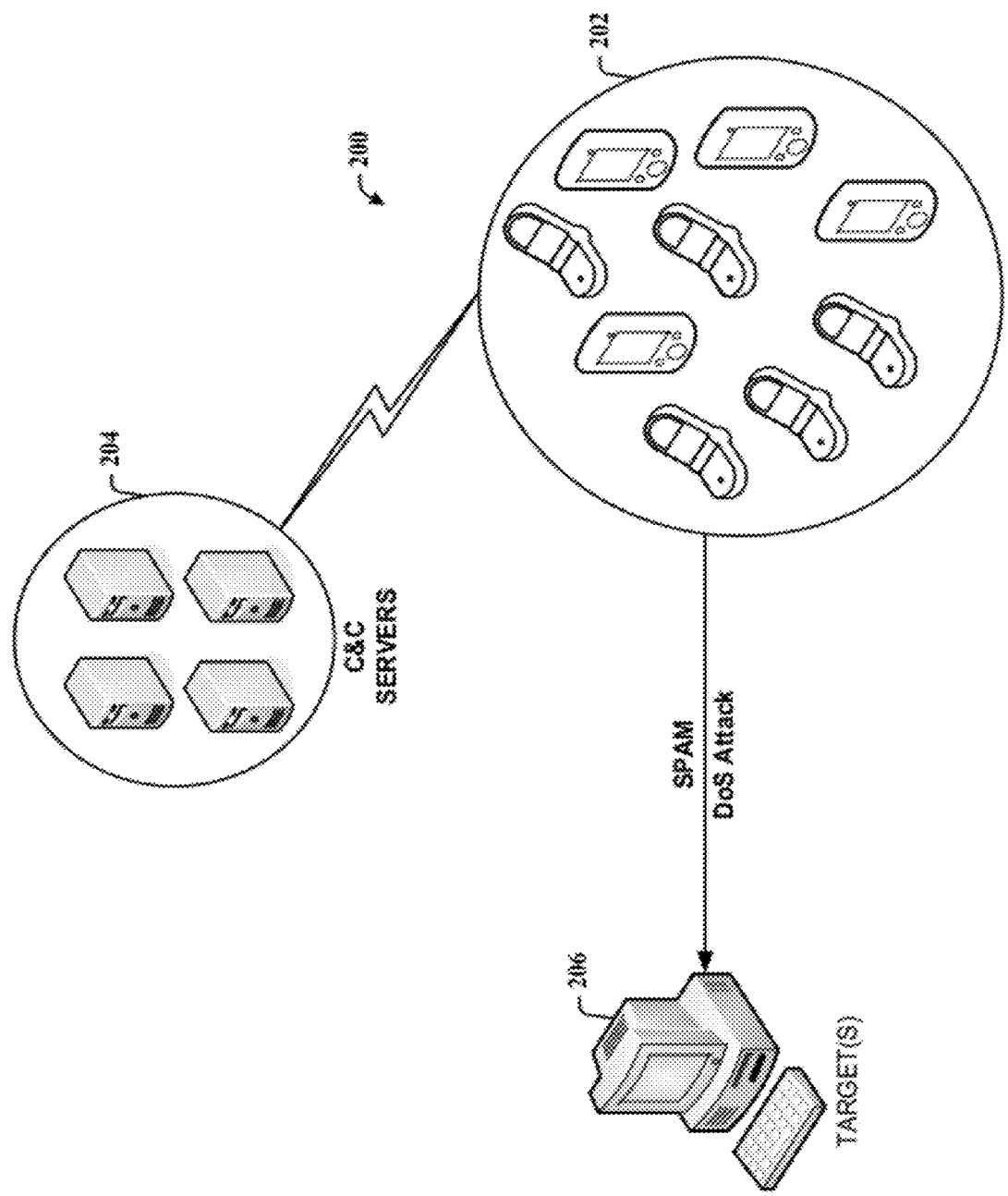
FIG. 2 illustrates is an example botnet system in accordance with aspects described herein.

Turning now to FIG. 2, illustrated is an example botnet 200 in accordance with aspects described herein. The botnet 200 includes a plurality of compromised mobile devices 202. As discussed previously, the compromised mobile devices 202 can be infected with malware via a plurality of techniques, including but not limited to text/multimedia messages, email, websites, and/or applications. When the mobile devices 202 are compromised, the malware can integrate the compromised mobile devices 202 into the botnet 200. Each of the compromised mobile devices 202 can be controlled by a set of command and control servers 204. It is to be appreciated that the set of command and control servers 204 can be comprised of a single command and control server. Typically, the set of command and control servers 204 are operated by a user acting as a bot master. For example, the bot master can issue commands to the compromised mobile devices 202, via the set of command and control servers 204, to generate spam messages directed toward a set of remote targets 206. It can be desirable for a bot master to generate spam using a large number of compromised mobile devices 202, as opposed to a single source, in order to escape detection. As an additional example, the bot master can issue commands to the compromised mobile devices 202, via the set of command and control servers 204, to execute a denial of service (DoS) attack against the set of remote targets 206. During a DoS attack, essentially, the bot master will use the compromised mobile devices 202 to saturate the set of remote targets 206 (e.g., website, web server, etc.) with communication requests (e.g., pings).

Additionally or alternatively, the compromised mobile devices 202 can be arranged in a peer-to-peer bot network (P2P botnet). In the P2P botnet, there is not a command and control server 204; rather, each compromised mobile device 202 is both a server and a client. The bot master can inject commands at any point in the P2P botnet, and the commands are disseminated among the compromised mobile devices using a peer-to-peer (P2P) communication protocol. Based on the foregoing, it can be appreciated that it would be desirable for mobile device users and wireless network administrators to have a system and/or method for mitigating malware, such as botnets, from infecting mobile devices.

Figure 3:
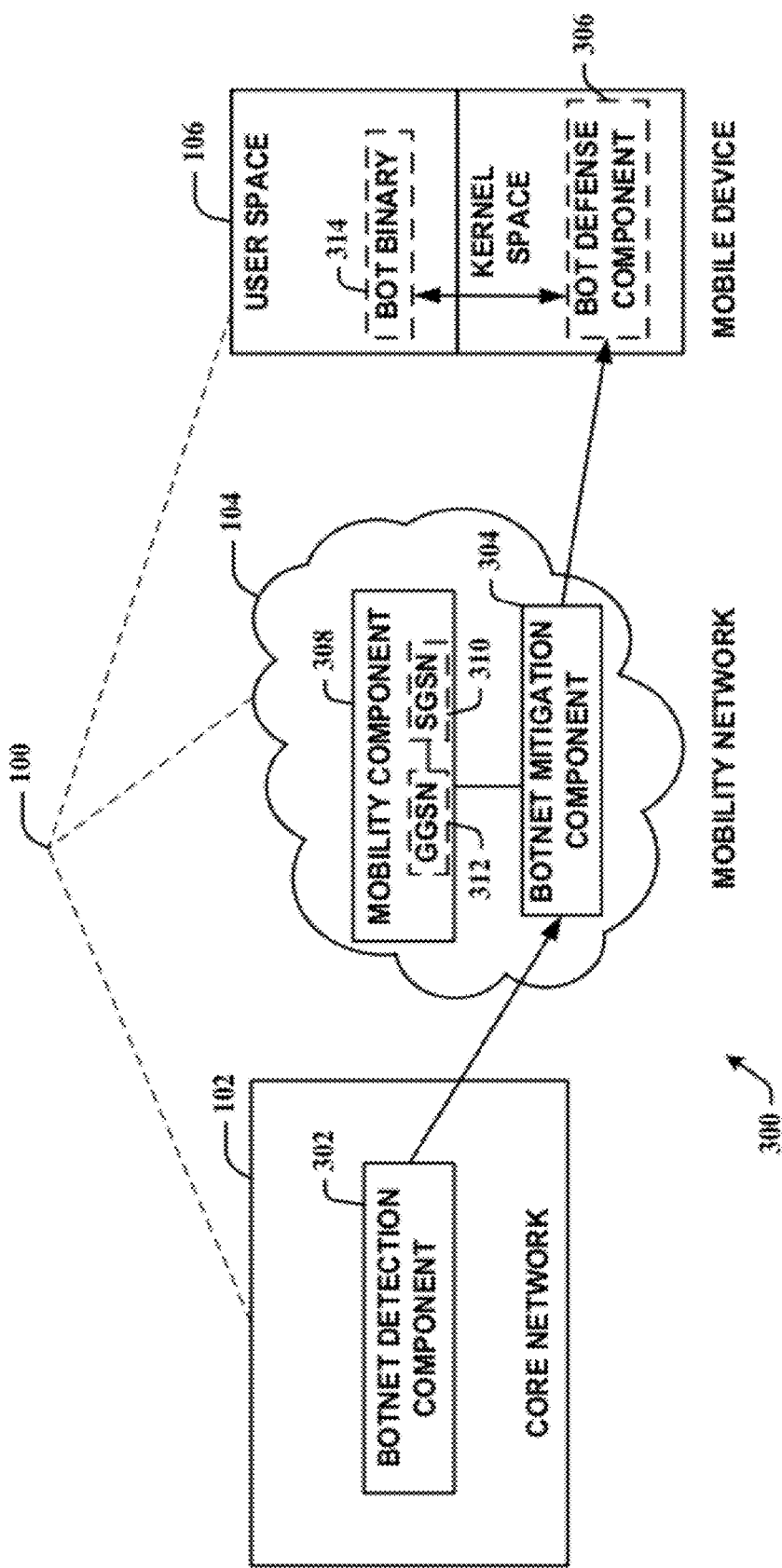
FIG. 3 illustrates an example block diagram of a botnet mitigation system in accordance with aspects described herein.

Referring to FIG. 3, illustrated is an example block diagram of a botnet mitigation system 300 in accordance with aspects described herein. The botnet mitigation system 300 includes a botnet detection component 302, a botnet mitigation component 304, and a bot defense component 306. The botnet detection component 302 operates, functions, or otherwise executes in the core network 102. Additionally or alternatively, the botnet detection component 302 can operate, function, or otherwise execute at an edge of the network 100, where the core network 102 connects to the mobility network 104. Placement of the botnet detection component 302 in the core network 102 or the edge of the network 100 enables the botnet detection component to analyze data flows and detect data flow patterns from virtually everywhere in the network 100 and/or mobility network 104.

The botnet detection component 302 can identify, recognize, or otherwise detect a set of devices, such as the mobile device 106 that are behaving like bots, and can also generate a traffic profile corresponding with the detected behavior. For example, typical bot behavior can include transmitting spam messages, scanning the network 100, and/or generating a set of traffic anomalies, wherein traffic anomalies consist at least in part of a set of data flows outside of or beyond the set data flows typically observed on the network 100. If the bot is an internet relay chat (IRC) bot, then the traffic profile of the bot can include sending traffic on a specific IRC port. Additionally or alternatively, the botnet detection component 302 can detect data flows from a bot on a compromised mobile device 106 to a known command and control server (See FIG. 2), and generate a traffic profile relating to communication with the known command and control server. Additionally or alternatively, the botnet detection component 302 can detect peer-to-peer botnets in the mobility network 104. The botnet detection component 302 can provide information relating to detected bots, including IP addresses, and traffic profiles, to the botnet mitigation component 304.

The botnet mitigation component 304 operates, functions, or otherwise executes in the mobility network 104. As discussed supra, the functionality of the mobility network 104 can include, but is not limited to, allocating network resources (e.g., IP address, IMSI, etc.) to the mobile device 106, handling traffic and signaling between the mobile device 106 and the core network 102, and so forth. The mobility network 104 can include a mobility component 308 that tracks mobility information, such as the IP address, physical location, and so forth of the mobile device 106. Where the network 100 is a second generation (2G) or a third generation (3G) network, the mobility component 308 can include a serving GPRS support node (SGSN) 310 and a gateway GPRS support node (GGSN) 312. The responsibilities of the SGSN 310 can include, but are not limited to, delivery of data packets to and from mobile devices within its geographical service area, packet routing and transfer, and authentication and charging functions. The GGSN 312 can be responsible for maintaining current location information for the mobile device 106, and maintaining routing data necessary to tunnel data to the SGSN 310 that services the particular mobile device 106. It is to be appreciated, that the aspects described herein are not limited to 2G or 3G networks, but can also be employed on various other communications networks, including, but not limited to, fourth generation (4G) wireless communication networks, such as those complying with the long term evolution (LTE) standards.

The botnet mitigation component 304 obtains, receives, or otherwise acquires information relating to detected bots from the botnet detection component 302, including, but not limited to, IP addresses, or traffic profiles. The botnet mitigation component 304 can use the information from the botnet detection component 302 to identify the compromised mobile device 106, and transmit, send, or otherwise communicate a warning message to the bot defense component 306 on the mobile device 106. The warning message can include, but is not limited to, the traffic profile of the bot infecting the mobile device 106, and/or a flag indicating that the mobile device (106) has been compromised by potential malware. The botnet mitigation component 304 can locate and communicate with the mobile device 106 via the mobility component 308.

The bot defense component 306 operates, functions, or otherwise executes in kernel space of the mobile device 106. The bot defense component 306 can correlate the flow of data in the kernel space of the mobile device 106 to the traffic profile included in the warning message in order to indentify, locate, or otherwise determine an application or binary 314 that is generating the information contained in the traffic profile. The bot defense component 306 is able to inspect or intercept all data traffic on the mobile device 106 generated by applications and/or binaries, because it executes in the kernel space of the mobile device 106. When the bot defense component 306 has identified the application or binary related to the traffic profile the bot defense component 306 can remove, delete, or otherwise the erase the application or binary from the device. Additionally or alternatively, the bot defense component 306 can prompt a user to inform them that the binary or application is behaving as a bot, and allow the user to determine to remove, delete, or otherwise the erase the application or binary from the device. If the user determines not to remove the binary or application behaving as a bot, the bot defense component 306 can perform additional mitigating actions including, but not limited to, selectively dropping packets originating from the binary or application behaving as a bot. It is to be appreciated that a plurality of applications and/or binaries may correlate to the traffic profile obtained by the bot defense component 306. For instance, a user may have downloaded a plurality of games from the same publisher, wherein each game is infected with the same bot. It is to be appreciated that the bot defense component 306 can additionally or alternatively operate on a wired device (not shown), wherein the bot defense component 306 operable on a wired device can obtain the warning message from the botnet detection component 302 or the botnet mitigation component 304.

Figure 4:
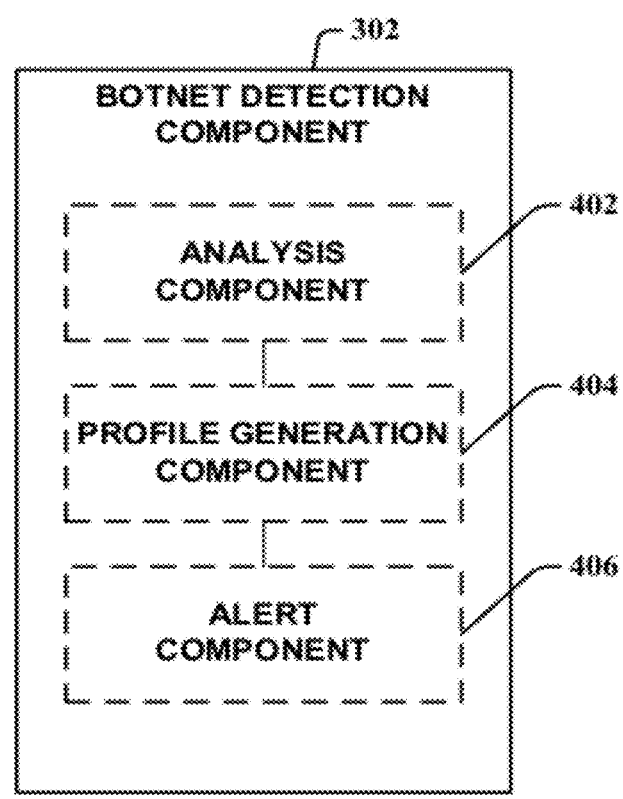
FIG. 4 illustrates an example block diagram of a botnet detection component in accordance with aspects described herein.

Turning now to FIG. 4, illustrated is an example block diagram of a botnet detection component 302 in accordance with aspects described herein. The botnet detection component 302 includes an analysis component 402, a profile generation component 404, and an alert component 406. The analysis component 402 analyzes data in the core network 102 or at the edge of the network 100 where the core network 102 connects to the mobility network 104 (see FIG. 1), and based on the analysis of data traffic and data flows can identify a set of ip addresses that are suspected of being compromised by malware and behaving as bots. In addition, the analysis component can determine if the suspect ip addresses are part of the mobility network 104 (See FIG. 1).

The analysis component 402 can detect the existence of bots in the network 100 via a plurality of techniques. For instance, the analysis component 402 can start with information related to one or more bots previously known to be in the network 100, and can identify data traffic and data flows that are similar to the data traffic and data flows generated by the known bots. In addition, the analysis component 402 can follow data traffic to a known command and control server (See FIG. 2), and identify bots that attempt to communicate with the known command and control server. Additionally, the analysis component 402 can employ cluster analysis and single out groups of IP addresses that behave in a similar manner that might be indicative of a botnet, such as scanning the network 100, sending spam messages, etc. Furthermore, the analysis component can detect peer-to-peer botnets in the network 100.

The profile generation component 404 generates a traffic profile of the suspected bot behavior. For example the profile generation component 404 can generate a profile for a suspected IRC bot that includes transmission of data on a set of IRC ports. The alert component 406 acquires, receives, or otherwise obtains the identity of the mobile devices 106 suspected of behaving as bots from the analysis component 402, and an associated traffic profile of the suspected bot behavior from the profile generation component 406. The identity and associated traffic profile of a suspected compromised mobile device are sent, transmitted, or otherwise provided to the botnet mitigation component (discussed below) by the alert component 406.

Figure 5:
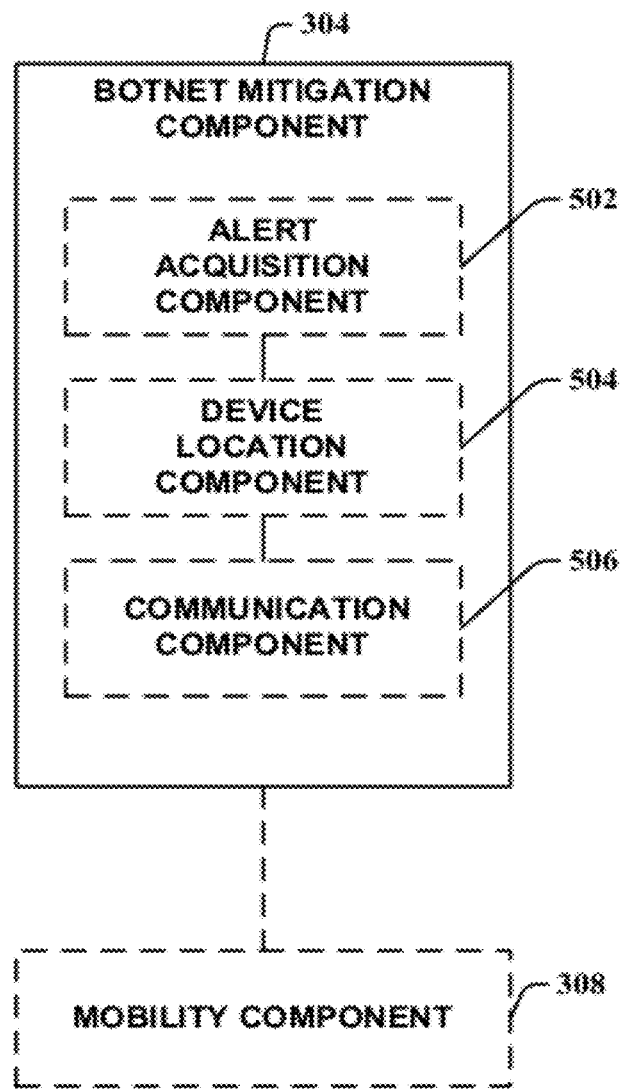
FIG. 5 illustrates an example block diagram of a botnet mitigation component in accordance with aspects described herein

Referring to FIG. 5, illustrated is an example block diagram of a botnet mitigation component 304 in accordance with aspects described herein. The botnet mitigation component 304 includes an alert acquisition component 502, a device location component 504, and a communication component 506. The alert acquisition component 502 acquires, receives, or otherwise obtains an identity of a mobile device 106 that is suspected of behaving as a bot, and a traffic profile of the suspected bot behavior from the alert component 406 included in the botnet detection component 302 (See FIG. 4).

As discussed supra, the botnet mitigation component 304 operates, functions, or otherwise executes in the mobility network 104 (See FIG. 1). The functionality of the mobility network 104 can include, but is not limited to, allocating network resources (e.g., IP address, IMSI, etc.) to mobile devices, handling traffic and signaling between mobile devices and the core network 102, and so forth. The mobility network 104 can include a mobility component 308 that tracks mobility information, such as the IP address, physical location, and so forth of mobile devices operable on the network 100. The device location component 504 can determine a physical location of the suspected mobile device via the mobility component 308. In addition, the communication component 506 can send, transmit, or otherwise provide the suspected mobile device with the traffic profile of suspected bot behavior obtained from the botnet detection component 302. In addition, the communication component 506 can provide a flag or bit to the suspect mobile device to alert the mobile device that it may be infected with malware and/or be behaving as a bot.

Figure 6:
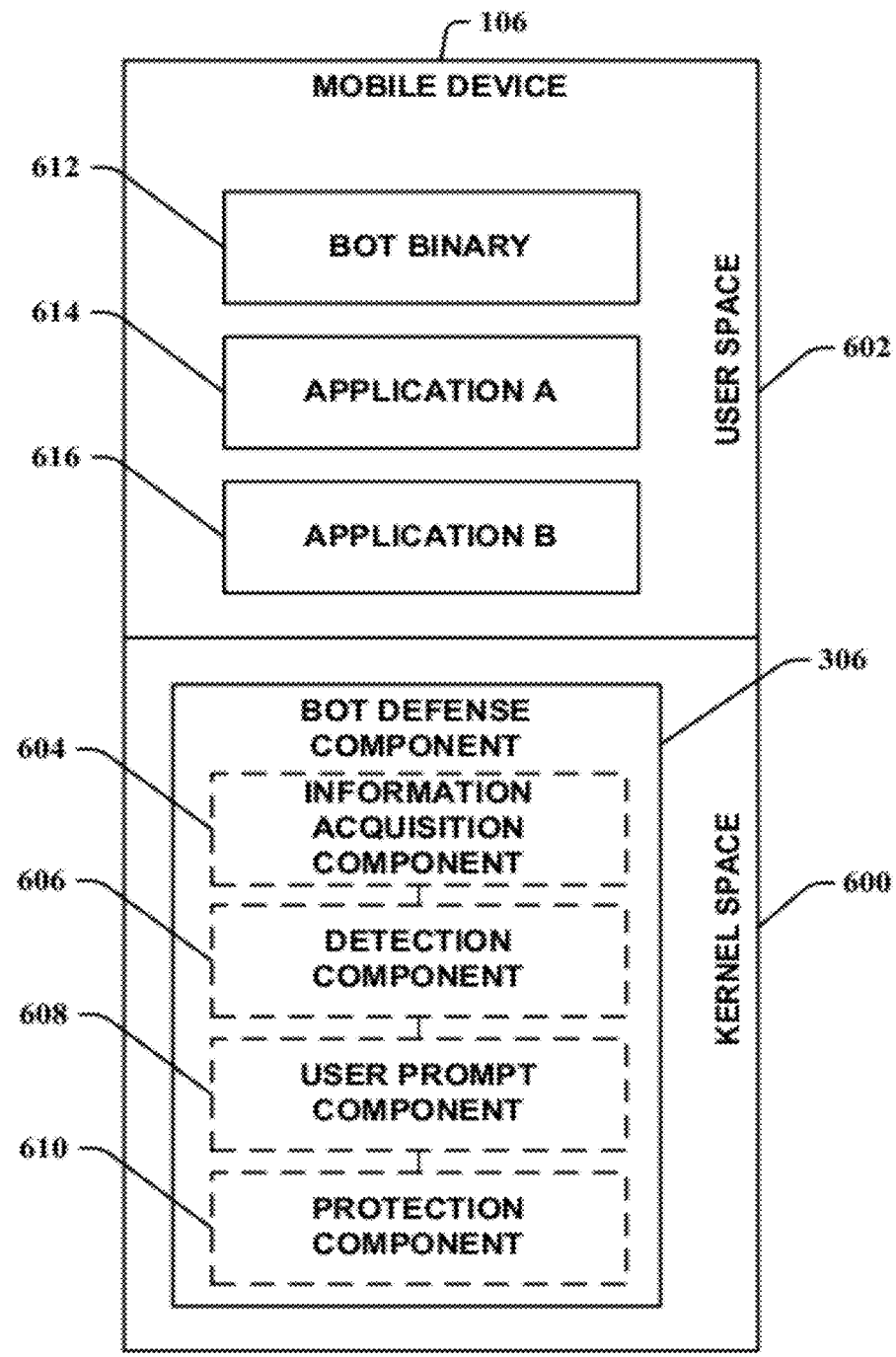
FIG. 6 illustrates an example block diagram of a mobile communication device in accordance with aspects described herein.

FIG. 6 illustrates an example block diagram of a mobile device 106 in accordance with aspects described herein. As discussed supra, the mobile device 106 can include, but is not limited to, tablet computers, smart phones, mobile phones, netbooks, portable music players, personal digital assistants (PDAs), laptops, electronic book devices (e-book readers), global positioning systems (GPS), and so forth. Typically, the operating resources of mobile devices 106 can be broadly separated into kernel space 600 and user space 602. The kernel space 600 operates as a bridge between a set of applications 612-616 that execute, perform, or otherwise operate in the user space 602 and data processing performed by the hardware (not shown) of the mobile device 106. As a consequence, virtually all data traffic on the mobile device 106 can be observed from the kernel space 600. Therefore, it may be desirable for the bot defense component 306 to reside, operate, or otherwise execute in the kernel space 600 of the mobile device 106.

The bot defense component 306 includes an information acquisition component 604, a detection component 606, a user prompt component 608, and a protection component 610. The information acquisition component 604 acquires, receives, or otherwise obtains a traffic profile of suspected malware that may be causing the mobile device 106 to behave as a bot. In addition, the information acquisition component can obtain a flag or bit that serves to notify the bot defense component 306 that the mobile device 106 is suspected of behaving as a bot or infected with malware. It is to be appreciated that the flag or bit can be included or associated with the traffic profile. The detection component 606 can intercept, observe, or otherwise inspect virtually all data traffic generated on the mobile device 106, and can correlate the data traffic with the traffic profile to determine at least one application or binary responsible for generating the suspect traffic profile. Returning to an earlier example, the traffic profile for an IRC bot can include generating traffic on a particular set of IRC ports. The detection component 606 can observe virtually all the data traffic on the mobile device and determine which of the applications and binaries 612-616 is generating traffic on the particular set of IRC ports. For instance, the detection component 606 can determine that the bot binary 612 is generating the traffic on the particular IRC ports, and determine that bot binary 612 is malware.

The user prompt component 608 can inform the user via an onscreen display, or other appropriate means, that the malware has been detected on the phone, and for example, that the infected application, bot binary 612, is behaving as a bot. The user prompt 608 can prompt the user to remove the infected application or ignore the warning. If the user decides to remove the infected application then the protection component 610 deletes, erases, or otherwise removes the infected application from the mobile device 106. The protection component 610 can perform additional mitigating actions if the user decides to ignore the warning, including but not limited to automatically dropping packets from the suspected application, quarantining the suspected application, or blocking user access to the suspected application. A decision to perform such additional mitigating actions can be based at least in part on a determination that the additional mitigating actions are required to protect the user and/or the wireless networks from aggressive botnet attacks. Additionally or alternatively, the protection component 610 can delete, erase, or otherwise remove the suspected application or binary without prompting the user. For example, a default option or a predetermined preference may instruct the bot defense component 306 to automatically remove any suspected applications or binaries. It is to be appreciated that the mobile device 106, can include a virtually infinite number of applications, and a plurality of the applications may be acting as bots.

Figure 7:
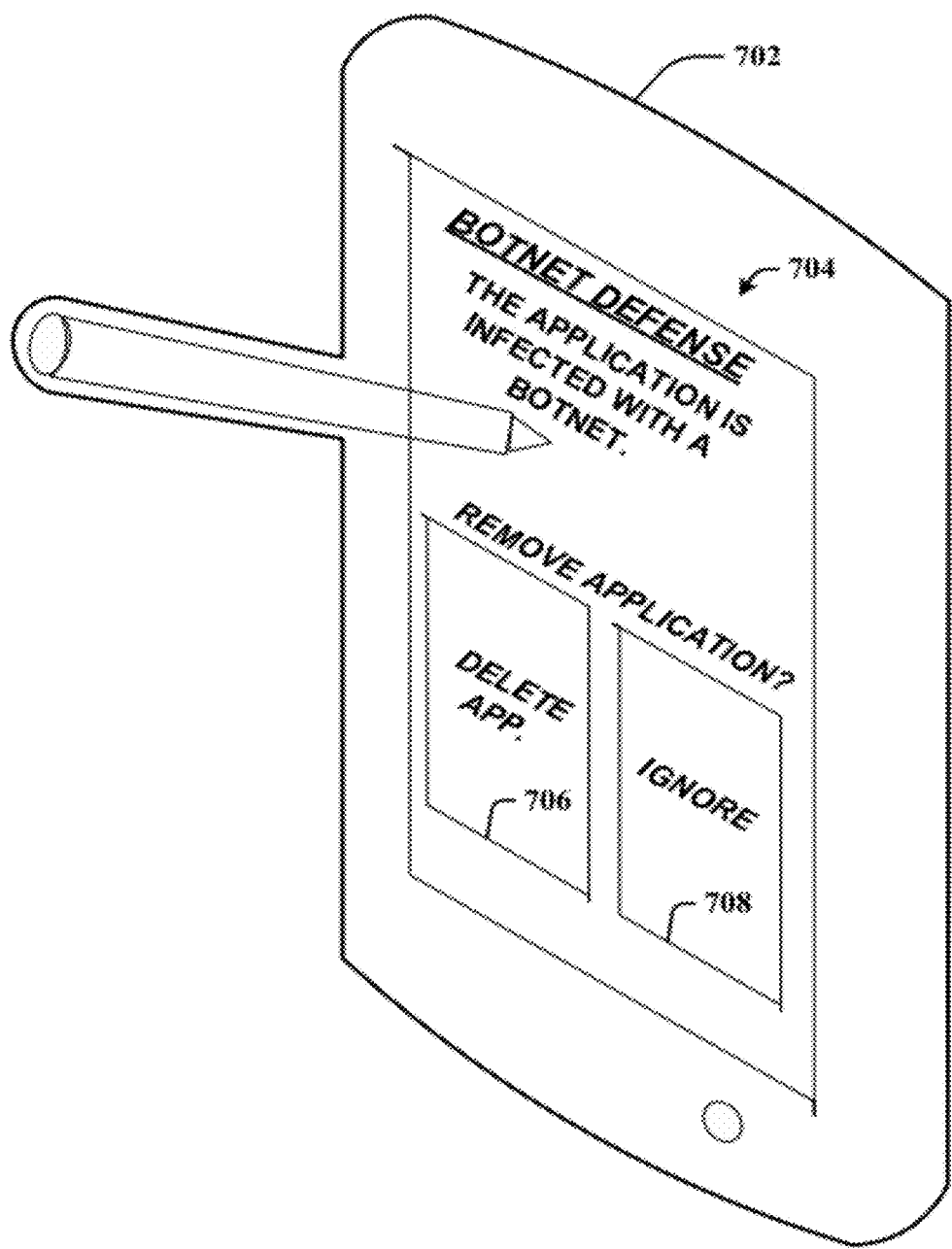
FIG. 7 illustrates an example user prompt for the botnet mitigation system in accordance with aspects described herein

Turning now to FIG. 7, illustrated is an example user prompt for the botnet mitigation system in accordance with aspects described herein. A mobile device 702 is shown as a touch screen device, such as a tablet pc, smart phone, etc. However, as discussed previously, the mobile device can include, but is not limited to, mobile phones, net books, portable music players, personal digital assistants (PDAs), laptops, electronic book devices (e-readers), global positioning systems (GPS), and so forth.

As discussed supra, the mobile device 702 will receive, obtain, or otherwise acquire information regarding a traffic profile of an application or binary that is suspected of behaving as a bot and infecting the mobile device. A botnet defense component (See FIG. 6) can correlate the traffic profile to the data traffic on the mobile device 702, and determine the specific application or binary responsible for generating the suspected traffic profile. Once the responsible application has been determined, a message 704 can be displayed to the user that malware has been detected on the device, and the user can be prompted to delete the application (app) or binary 706 or ignore 708 the warning.

The user can choose either the delete app option 706 or ignore option 708, by a plurality of means including, but not limited to, touching, clicking, orally commanding, or otherwise selecting the appropriate choice. If the user selects the delete app option 706, then the botnet defense component will erase, remove, or otherwise delete the suspected application from the mobile device 702. Conversely, if the user selects the ignore option 708, then the suspected application may remain on the mobile device 702, or the botnet defense component can perform additional mitigating actions, including but not limited to automatically dropping packets from the suspected application, quarantining the suspected application, or blocking user access to the suspected application. A decision to perform such additional mitigating actions can be based at least in part on a determination that the additional mitigating actions would be beneficial to protect the user and/or the wireless networks from aggressive botnet attacks. It is to be appreciated that the foregoing is merely an example illustration set forth for simplicity of explanation, and those reasonably skilled in the art will be able to identify a plurality of user prompts that are within the scope of the subject disclosure.

In view of the example systems described supra, methods that may be implemented in accordance with the disclosed subject matter may be better appreciated with reference to the flow charts of FIGS. 8-11. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 8:
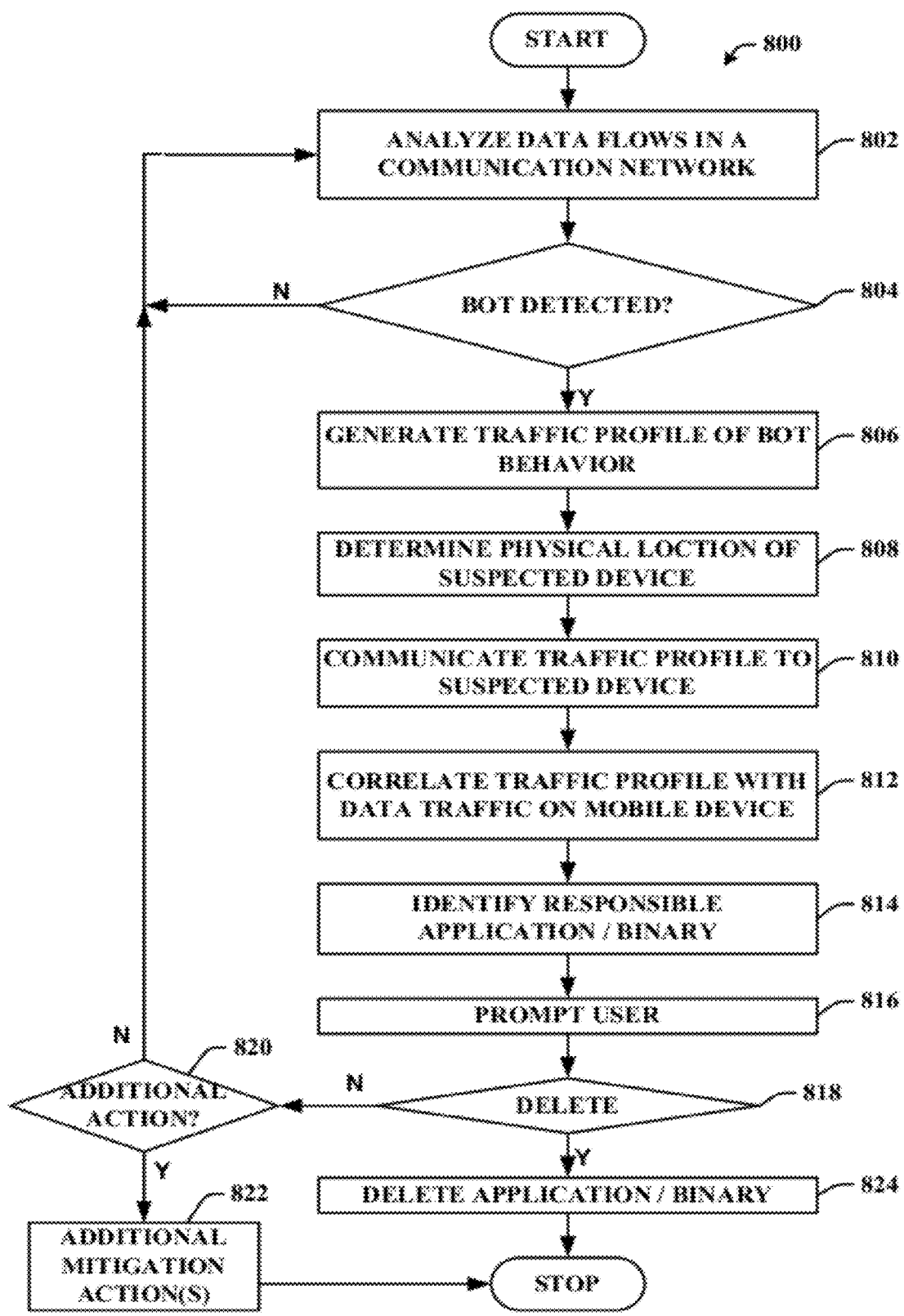
FIGS. 8-11 are flow diagrams of respective methods for botnet mitigation in a wireless communication system.

Turning now to FIG. 8, an example methodology for botnet mitigation in wireless networks is illustrated in accordance with aspects described herein. Methodology 800 can begin at block 802, wherein data flows and data flow patterns throughout a network are analyzed. At 804, a determination is made whether a device suspected of behaving as a bot has been detected in the network based on the analysis of the data flows and data flow patterns. If a device suspected of behaving as a bot has not been detected then the methodology returns to 802. If a device suspected of behaving as a bot has been detected, then at 806 a traffic profile of the bot behavior is generated. For example, typical bot behavior can include transmitting spam messages, scanning the network, and/or generating traffic anomalies. At 808, the physical location of the compromised device is determined, and at 810 the traffic profile of the suspected bot behavior is sent, transmitted, or otherwise provided to the suspected device.

At 812, the traffic profile is correlated with data traffic on the suspected device, and at 814 the application/binary responsible for generating the suspect traffic profile is identified based on the correlation of the data traffic with the traffic profile at 812. For example, if the bot is an IRC bot, then the traffic profile of the bot can include sending traffic on a specific IRC port, and it can be determined which application/binary is sending traffic on the specific IRC port.

At 816, a prompt can be displayed to the user informing the user that an application/binary on the device is behaving as a bot. The prompt can include options to delete the application/binary or ignore the warning. At 818, a determination is made whether the user has elected to delete the suspect application. If the user elects to ignore the warning or not delete the suspect application/binary (N at 818), then at 820 a determination is made whether additional action should be taken, the determination can be based at least in part on a decision that additional action is required to protect the user and/or the wireless networks from aggressive botnet attacks. If it is determined that additional action is not required (N at 820), then the methodology 800 can return to 802. If it is determined that additional action is required (Y at 820), then at 822 additional mitigation actions can be performed, including but not limited to automatically dropping packets from the suspect application/binary, quarantining the suspect application/binary, or blocking user access to the suspect application/ binary. If the user elects to delete the suspect application/ binary (Y at 818), then at 820 the application/binary is removed from the device.

Figure 9:
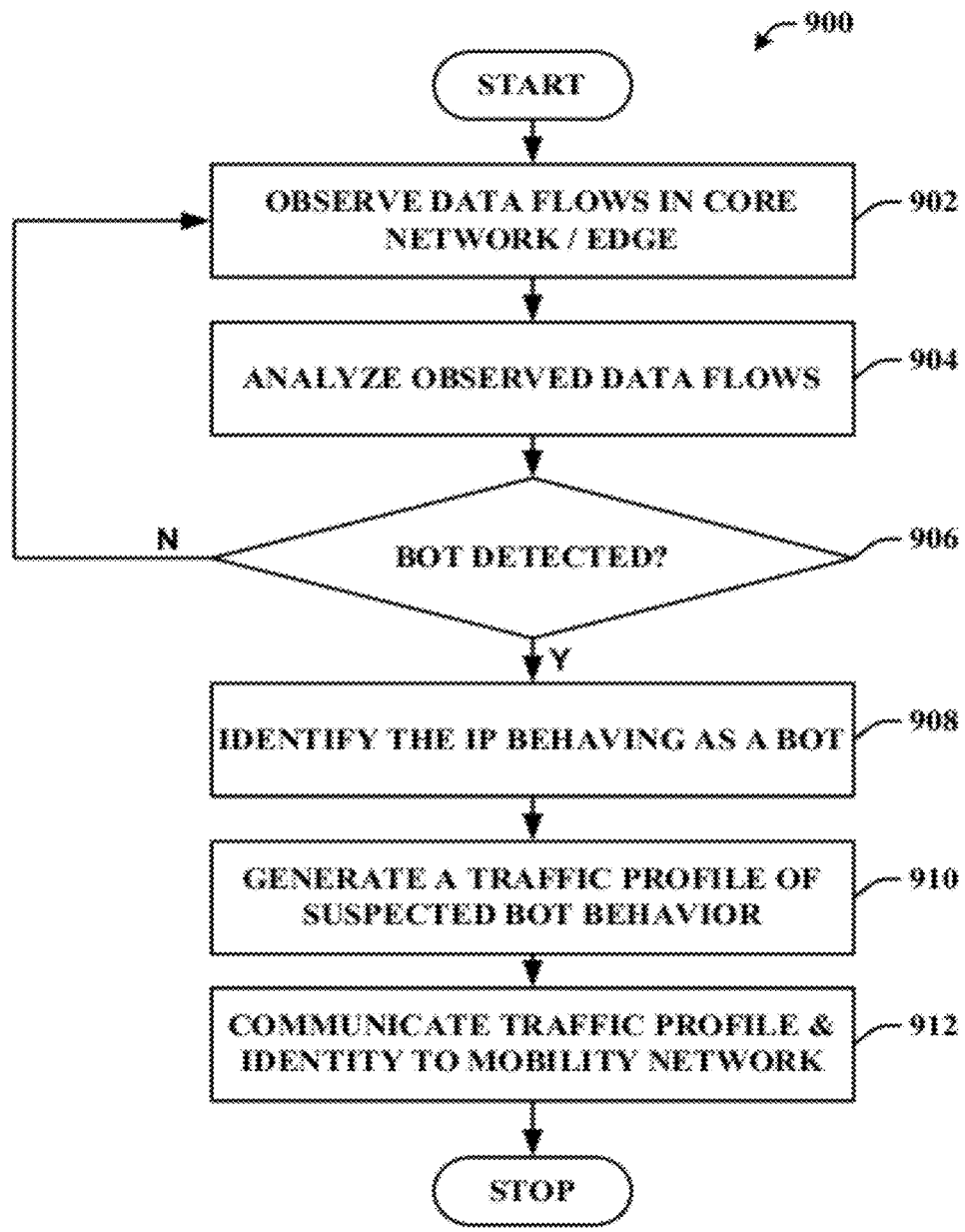

Referring to FIG. 9, an example methodology for botnet detection in accordance is illustrated in accordance with various aspects described herein. Methodology 900 can begin at block 902, wherein the data flows and data traffic for a network are observed from the core network or an edge of the network where the core network and a mobility network are communicatively coupled. At 904, the observed data flows and data traffic are analyzed to determine if there are IP addresses in the network behaving as bots. A plurality of techniques can be employed to determine if there are mobile devices behaving as bots. For instance, the analysis can be based on one or more known bots in the network, and can identify data traffic and data flows that are similar to the data traffic and data flows generated by the known bots. Additionally or alternatively, analysis can include following data traffic to a known command and control server (See FIG. 2), and identifying bots that attempt to communicate with the known command and control server. Additionally or alternatively, analysis can include employing cluster analysis, and singling out groups of IP addresses that behave in a similar manner that might be indicative of a bot. Such behavior can include scanning the network, sending out spam messages, and so forth.

At 906, a determination is made whether an IP address suspected of behaving as a bot has been detected. If an IP address suspected of behaving as bot has not been detected (N at 906), then the methodology 900 can return to 902. If an IP address suspected of behaving as bot has been detected (Y at 906), then at 908 the suspect IP address is identified. At 910, a traffic profile of the suspected bot behavior can be generated. For example, if suspected bot behavior is of an IRC bot, then the traffic profile can include transmitting data on a particular set of IRC ports. As additional or alternative examples, the traffic profile can include generating spam messages, scanning the network, or virtually any malicious activity. At 912, the traffic profile and identity of the suspect IP address are communicated to the mobility network.

Figure 10:
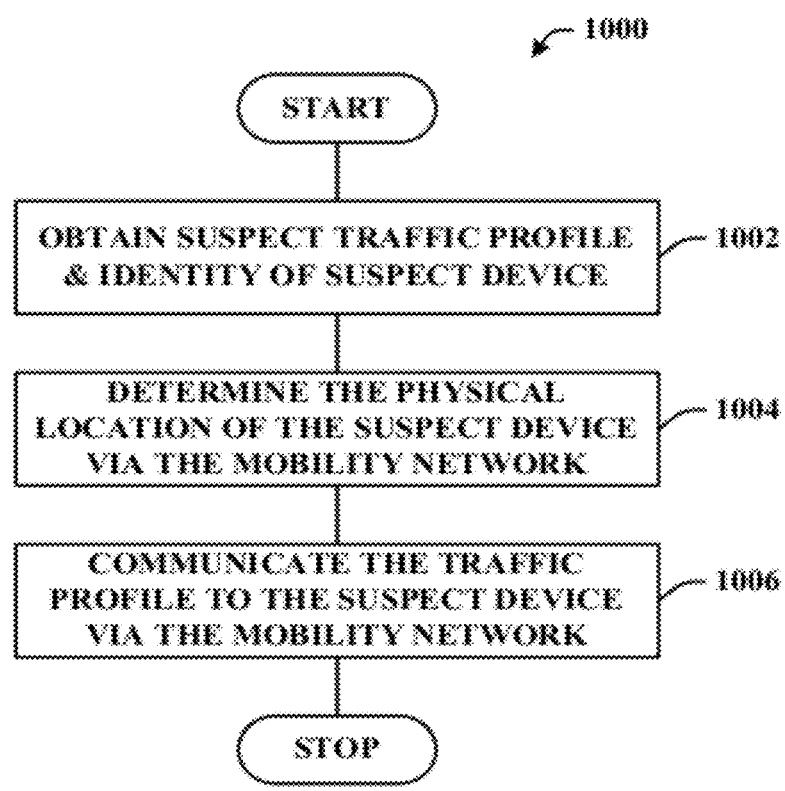

Turning now to FIG. 10, an example methodology of botnet mitigation is illustrated in accordance with various aspects described herein. Methodology 1000 can begin at block 1002, wherein a traffic profile and identity of a mobile device that is suspected of behaving as a bot is received, acquired, or otherwise obtained. As discussed supra, the identity of the suspect mobile device can include the IP address of the mobile device.

At 1004, a physical location of the mobile device can be determined via the mobility network. As discussed supra, the functionality of the mobility network can include, but is not limited to, allocating network resources to mobile devices, handling traffic and signaling between the mobile devices and the core network, and so forth. In addition, if the wireless network is a 2G or a 3G network, it can include a serving GPRS support node (SGSN) and a gateway GPRS support node (GGSN). The responsibilities of the SGSN can include, but are not limited to, delivery of data packets to and from wireless devices within its geographical service area, packet routing and transfer, and authentication and charging functions. The GGSN 312 can be responsible for maintaining current location information for the wireless device, and maintaining routing data necessary to tunnel data to the SGSN 310 that services the particular wireless device. Therefore, it can be appreciated how the determining the physical location of the suspect mobile device is accomplished via the mobility network.

At 1006, the traffic profile is communicated to the mobile device via the mobility network. As discussed supra, if the suspected bot behavior is of an IRC bot, then the traffic profile can include transmitting data on a particular set of IRC ports. As additional or alternative examples, the traffic profile can include generating spam messages, scanning the network, or virtually any malicious activity. Additionally, a warning flag or bit indicating that an application or binary that is acting as a bot is present on the mobile device can be communicated to the mobile device.

Figure 11:
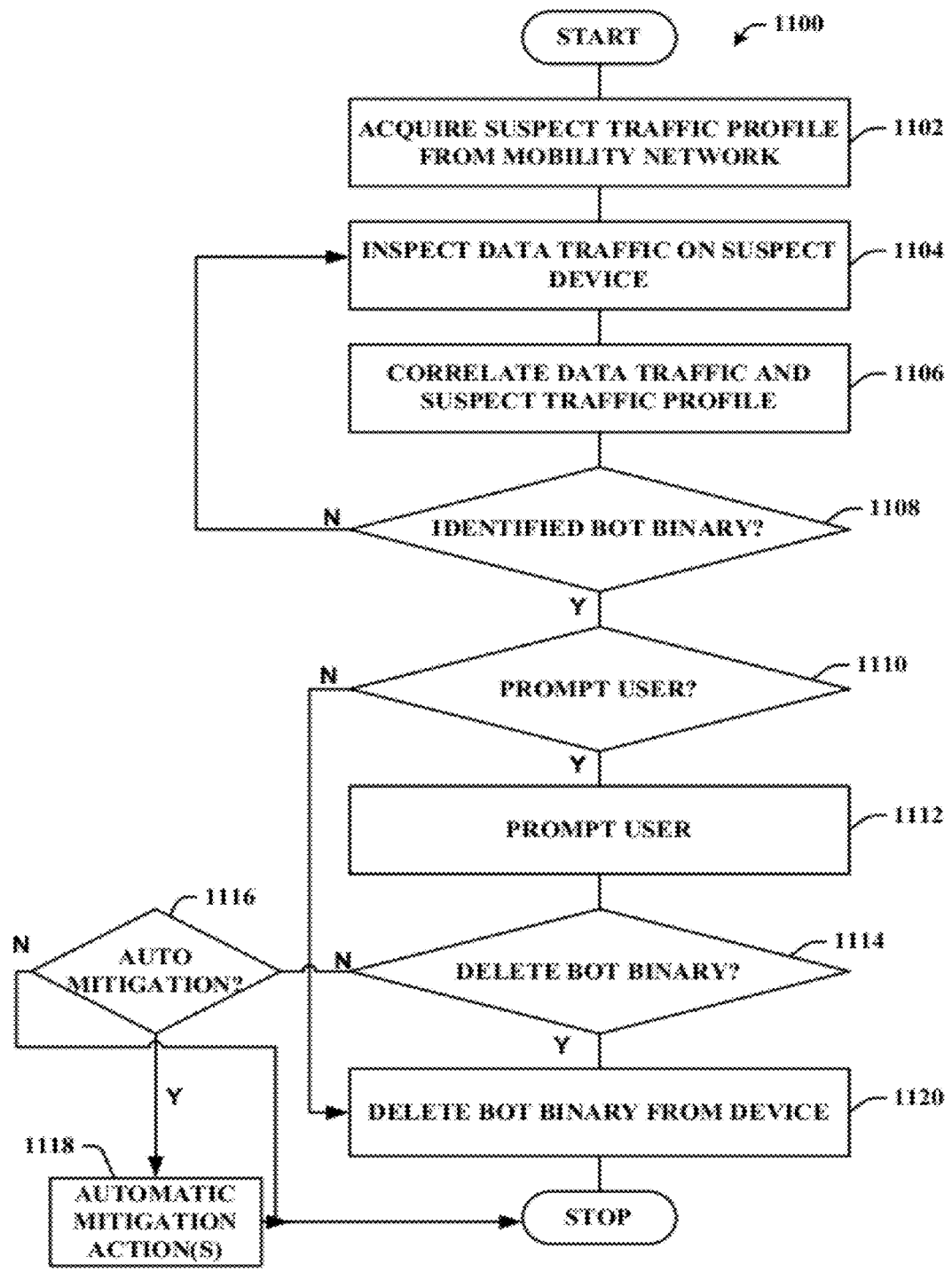

Turning now to FIG. 11, an example methodology of botnet mitigation on a mobile device is illustrated in accordance with aspects described herein. Methodology 1100 can begin at block 1102, wherein a suspected traffic profile is obtained, received, or otherwise acquired from a mobility network. The suspected traffic profile can include information relating to bot like behavior that is suspected of occurring on the mobile device. In addition, a flag or bit indicating that the mobile device may be infected by malware and/or behaving as a bot can be associated with the traffic profile.

At 1104, the data traffic on the mobile device is inspected, and at 1006 the data traffic on the mobile device is correlated, compared, or otherwise analyzed against the suspected traffic profile. For example, if the suspected traffic profile is of an IRC bot, then the traffic profile can be compared with the data traffic on the mobile device to determine if any applications or binaries are generating traffic on a suspected set of IRC ports.

At 1108, a determination is made as to whether a binary (or application) matching the traffic profile has been identified? If a binary matching the traffic profile has not been identified (N at 1108), then the methodology 1100 returns to the 1104, and continues inspecting data traffic on the mobile device. If a binary matching the traffic profile has been identified (Y at 1108), then at 1110 a determination is made whether to prompt the user. The determination of whether to prompt the user can be a default setting or predetermined preference, wherein the methodology always, never, or on the occurrence of a predetermined condition prompts the user to remove the bot. If the determination is made to prompt the user (Y at 1112), then at 1112 the user is prompted via an onscreen display, or other appropriate means, that malware has been detected on the phone, and that the determined binary is behaving as a bot. At 1114, a determination is made by the user whether to delete the suspected bot binary. If the determination is not to delete the suspected bot binary (N at 1114), then at 1116 a determination is made whether automatic mitigation should be performed, the determination for automatic mitigation can be based at least in part on a decision that mitigation action is required to protect the user and/or the wireless networks from aggressive botnet attacks. For example, the traffic profile obtained by the mobile device can include a warning or specification that additional action may be required to protect the user and/or wireless networks if the user elects not to remove the suspect binary. If it is determined that automatic mitigation is not required (N at 1116), then the methodology 1100 can terminate. If it is determined that automatic mitigation actions should be performed (Y at 1116), then at 1118 automatic mitigation actions can be performed, including but not limited to automatically dropping packets from the suspect binary, quarantining the suspect binary, or blocking user access to the suspect binary.

If the determination is made to delete the suspected bot binary (Y at 1114), then at 1120 the suspected binary is erased, deleted, or otherwise removed from the mobile device. Returning to 1112, if it is determined to not prompt the user (N at 1112) then the methodology proceeds to 1120, wherein the suspected binary is erased, deleted, or otherwise removed from the mobile device.

Figure 12:
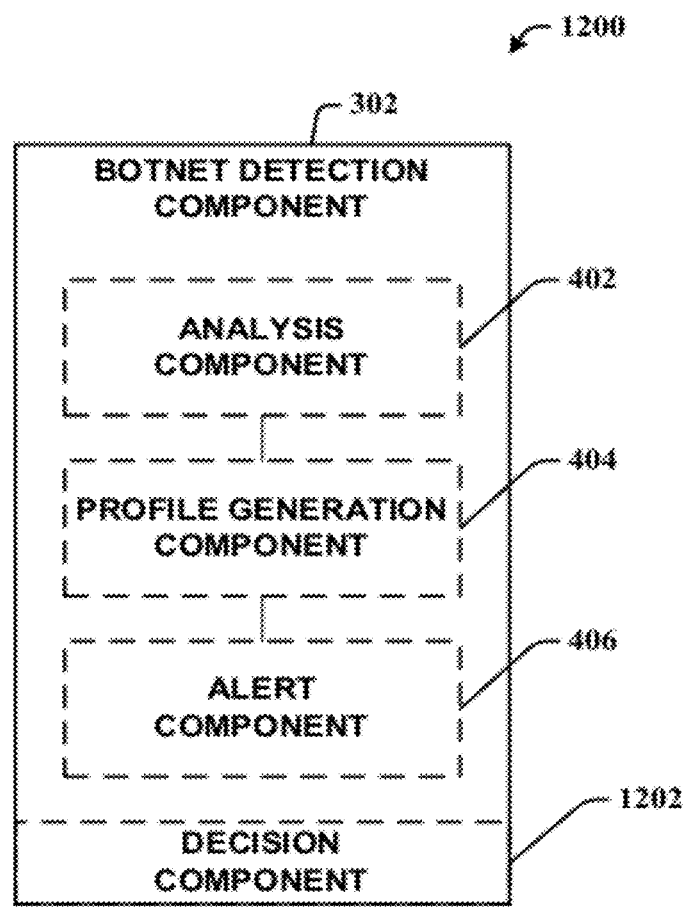
FIG. 12 illustrates an example block diagram of a system that employs an artificial intelligence component which facilitates automating one or more features in accordance with aspects described herein.

FIG. 12 illustrates a system 1200 that employs a decision component 1202 which facilitates automating one or more features in accordance with aspects described herein. Various embodiments (e.g., in connection with inferring) can employ various decision facilitating schemes for carrying out various aspects thereof. For example, a process for botnet detection, data flow and data traffic analysis, or profile generation can be facilitated via an automatic classifier system and process.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Figure 13:
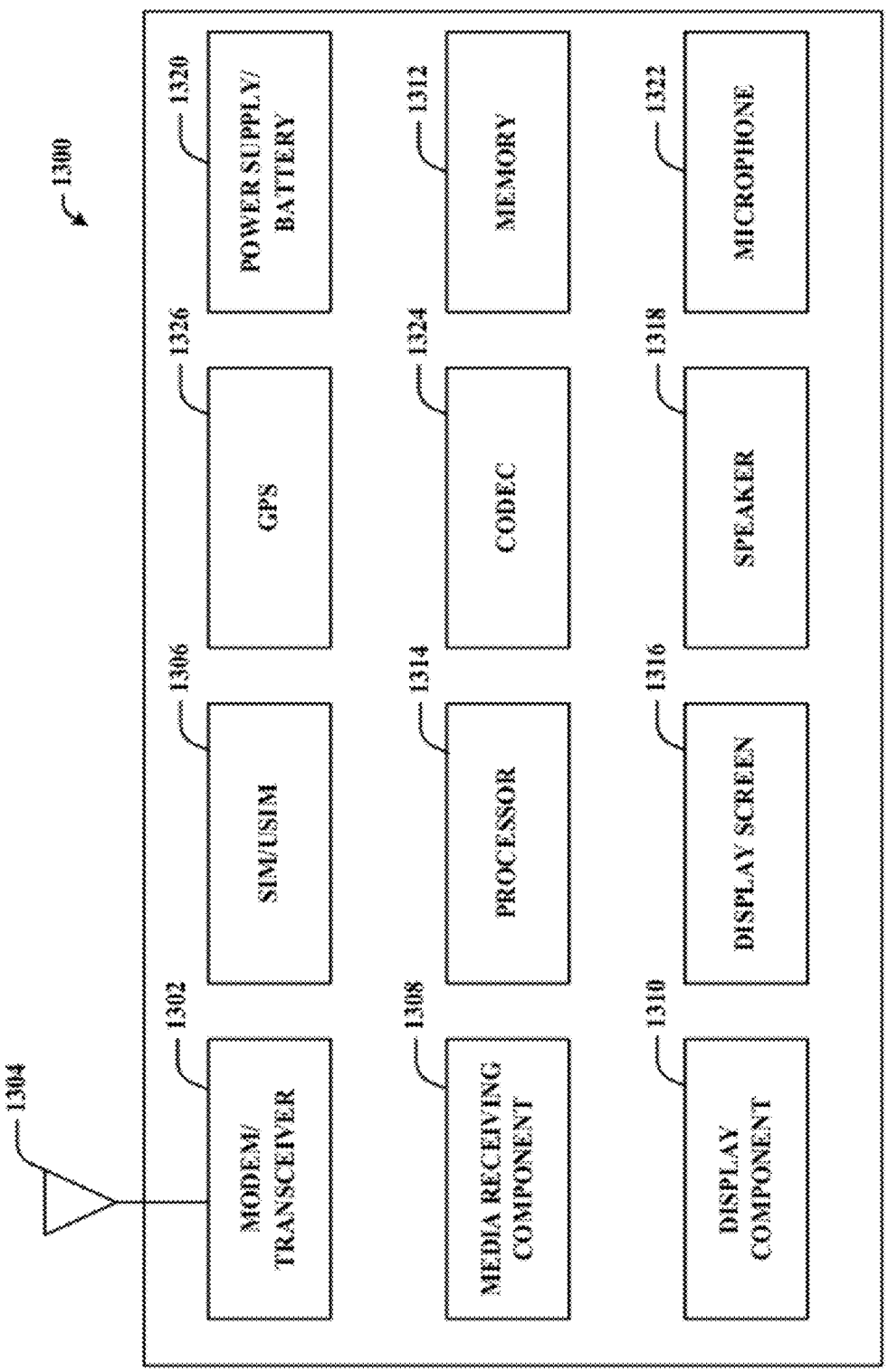
FIGS. 13-16 illustrate example systems that can be employed with various aspects described herein.

FIG. 13 illustrates an additional or alternative example aspect of a wireless system that can implement features and aspects described herein and operated in accordance with such features and aspects. The example system 1300 can include a modem 1302 that can wirelessly communicate with a wide area network, for example, employing a 2G/3G/3.5G/4G wireless connection. As an example, the modem 1302 can be a wireless wide area network (WWAN) modem/transceiver such as a GPRS/EDGE/CDMA/UMTS/HSPA/LTE modem that can transfer digital images (or other media files) and/or control data. Moreover, the modem 1302 can operate in any of the commonly used wireless spectrum bands. As an example, the modem 1302 can be IPv6 (Internet Protocol version 6) enabled. It can be appreciated that the modem 1302 can be embedded in the system 1300 or external to the system and can be connected to an antenna 1304 to receive and/or transmit data. The antenna 1304 can be external or internal. Moreover, the modem 1302 can receive instructions sent by a remote user (e.g. system subscriber) over a network, e.g., a mobile network platform that serves a network of deployed access points, to change one or more settings and/or perform one or more functions on the example system 1300, for example, load, delete or play a file.

Furthermore, the modem 1302 can also be configured to receive wireless alerts (SMS, Image)/broadcast from a mobile network platform. Additionally, the example system 1300 of a can include a SIM (Subscriber Identity Module) or USIM (Universal Subscriber Identity Module) 1306 associated with the system users account subscription. The SIM or USIM 1306 can be prepaid, flat rate monthly, or usage based. Further, the SIM or USIM 1306 may need to be a locked to the specific type of device (e.g., a wireless digital media that employs a WWAN modem) to prevent it from being used in a mobile phone or wireless data device to prevent network abuse if lower rates, including flat rate, are offered to the system subscribers.

A media receiving component 1308 can receive media files, e.g., content(s), sent to the example system 1300 through an access point via the modem 1302. Received media files can be displayed through display component 1310. The modem 1302 can include control functions to enable communication with the WWAN and transfer of data in the downlink. The modem 1302 can be downlink enabled and can optionally allow the ability to transfer data in the uplink (UL) direction beyond control channels. For example, the system 1300 can transfer data associated with available free space in memory 1312 to a mobile network platform in the UL. Further, the modem 1302 can be configured to allow network control such that transfer of data could occur at various times of the day based on network/sector loading due to traffic and propagation conditions and/or based on user preferences. Further, the modem 1302 can be configured to work on a prepaid condition or active account or unlimited usage account.

The system 1300 can typically include a processor 1314 that can be a processor based controller chip. Specifically, the processor 1314 can be a processor dedicated to analyzing information received by modem 1302 and/or generating information for transmission on the UL, a processor that controls one or more components of the system 1300, a processor that facilitates output of media files on a display screen 1316 or via speaker 1318, and/or a processor that both analyzes information received by modem 1302, generates information for transmission on the UL, controls one or more components of the system 1300 and facilitates output of media files on a display screen 1316 or via speaker 1318.

The system 1300 can additionally comprise memory 1312 that is operatively coupled to processor 1314 and that can store data to be transmitted, received data, data associated with analyzed signal and/or interference strength, information related to an assigned channel, power, rate, or the like, and any other suitable information for estimating a channel and communicating via the channel. Memory 1312 can additionally store media files received from a sender over a network. Further, memory 1312 can also store user preferences and/or predefined user settings. In one example, memory 1312 can be partitioned, such that locally downloaded media files (e.g. downloaded by an end user) are stored in one partition and remotely downloaded media files (e.g., content(s) are stored in another partition. A number of program modules can be stored in the memory 1312, including an operating system, one or more application programs, other program modules and/or program data. It is appreciated that the aspects described herein can be implemented with various commercially available operating systems or combinations of operating systems.

Additionally, a system bus (not shown) can be employed to couple system components including, but not limited to, the system memory 1312 to the processor 1314. The system bus can be any of several types of bus structure that may further interconnect to a memory bus (with or without a memory controller), a peripheral bus, and a local bus using any of a variety of commercially available bus architectures.

The media files received from the mobile wireless network can be displayed on the display screen 1316 and/or audio files can be played via the speaker 1318. It can be appreciated that the media files stored in the memory 1312 can also be received via ports such as, but not limited to, USB, USB2, 1395, SD card, Compact Flash, etc. Additionally, system 1300 can include a power supply/battery 1320 that can be employed to power the system. As an example, power management techniques can be employed to save battery power, such that the battery can last longer between recharge cycles.

An end user can enter commands and information through one or more wired/wireless input devices, e.g., a keyboard, a pointing device, such as a mouse and/or a touch screen display 1316. A microphone 1322 can also be employed to enter data. For example, the end user can employ the microphone 1322 to enter an audio clip associated with an image. These and other input devices are often connected to the processor 1314 through an input device interface (not shown) that is coupled to a system bus, but can be connected by other interfaces, such as a parallel port, an IEEE 1394 serial port, a game port, a USB port, an IR interface, and so forth.

The system 1300 can further include a codec 1324 that can be employed encode and/or decode digital data. The codec 1324 can employ most any compression and/or decompression algorithm to compress/decompress a received media file. Furthermore, the system 1300 can include a GPS (global positioning system) 1326 that can be employed to determine the current geographical coordinates of the example the system 1300. The GPS 1326 can include a separate GPS antenna (not shown) or employ the antenna 1304 to communicate with a GPS satellite. In one example, the example system 1300 can receive broadcast warnings, emergency alerts, weather alerts, etc. based on the current coordinates.

In addition, the example system 1300 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, and telephone. This includes at least Wi-Fi and Bluetooth™ wireless technologies. Thus, the communication can be a predefined structure as with a conventional network or simply an ad hoc communication between at least two devices. Wi-Fi, or Wireless Fidelity, allows connection to the Internet from a couch at home, a bed in a hotel room, or a conference room at work, without wires. Wi-Fi is a wireless technology that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
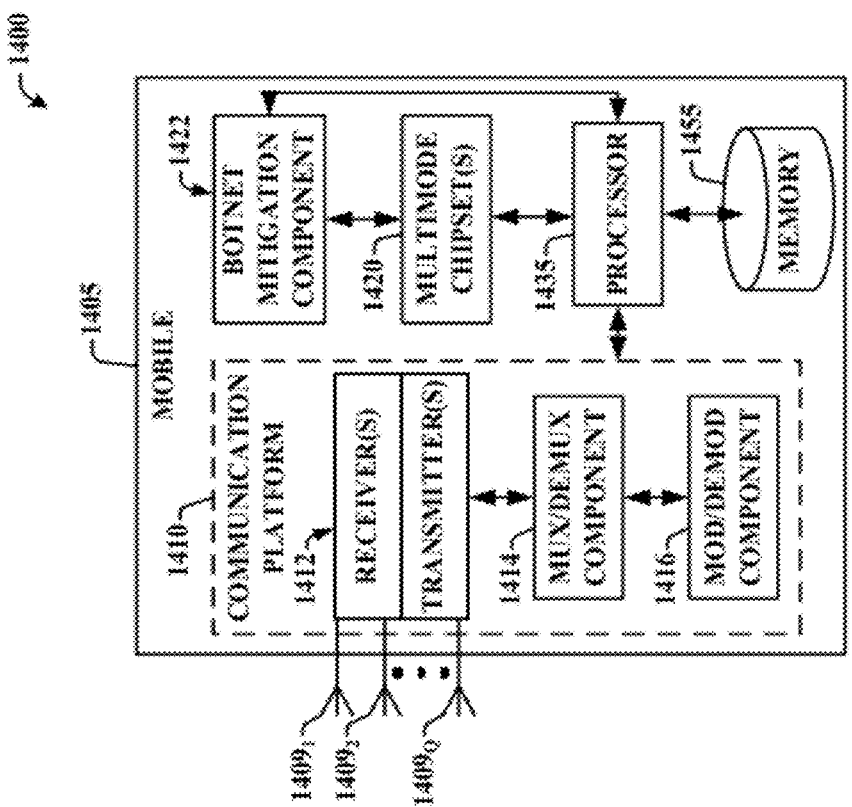
Figure 15:
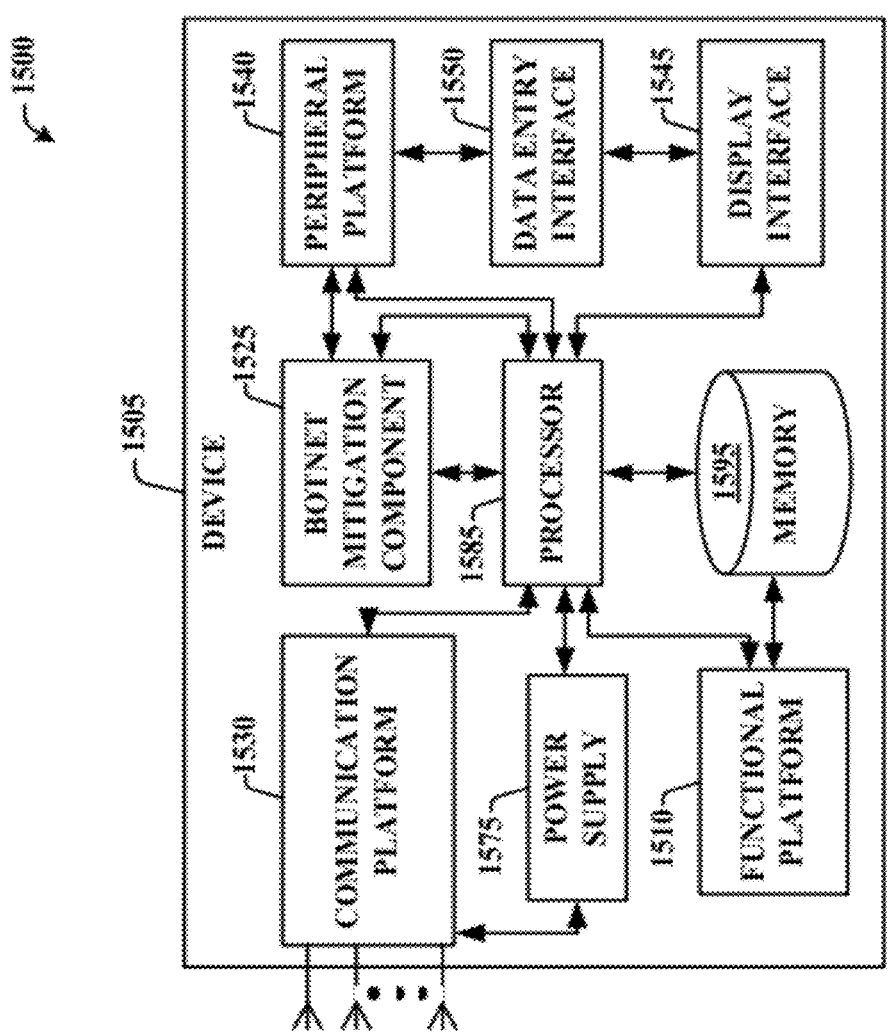
Figure 16:
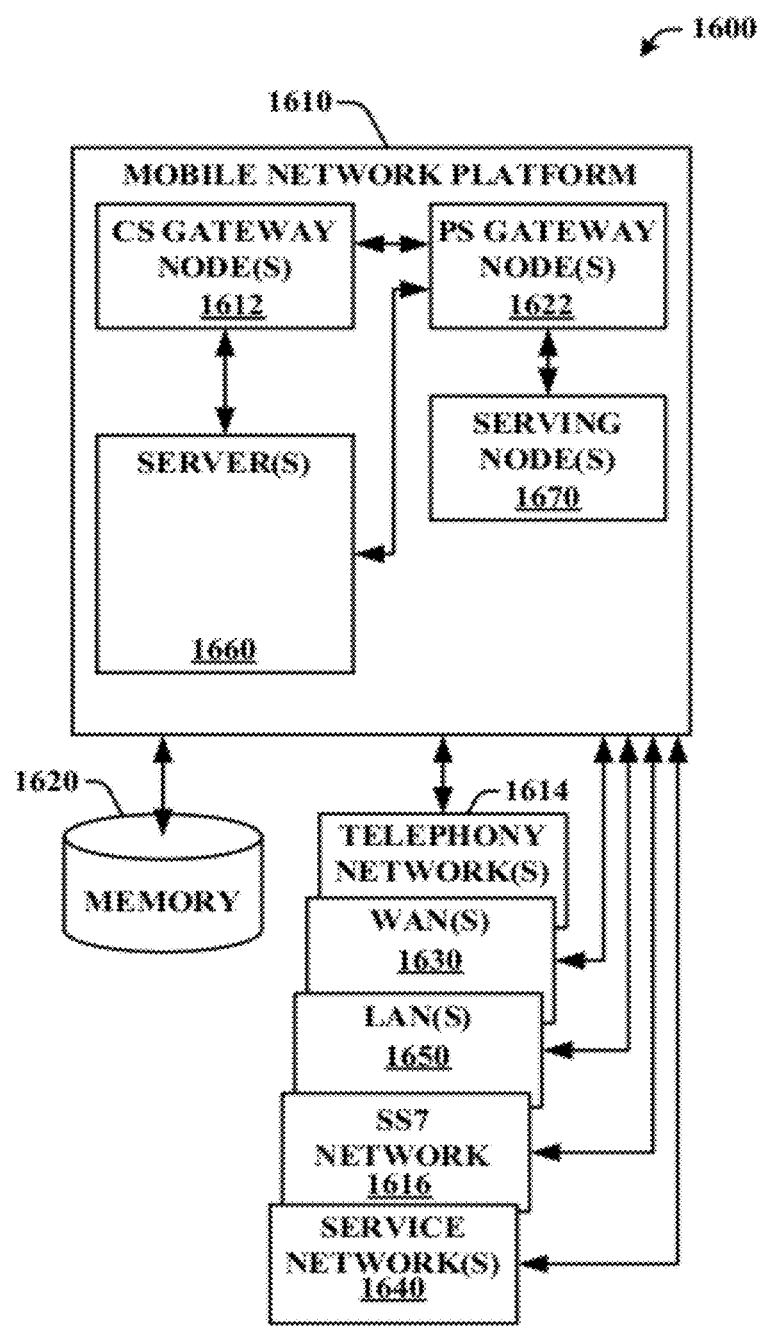

To provide further context for various aspects described herein, FIG. 14 illustrates a non-limiting example block diagram of a system 1400 of a mobile 1405 that can deliver content(s) or signaling directed to a device in accordance with aspects described herein. Additionally, FIG. 15 illustrates a non-limiting example block diagram of a system 1500 of a non-mobile device 1505, which can be provisioned through a non-mobile network platform and can be employed to convey content(s) or signaling to a device in accordance with aspects described herein. Furthermore, FIG. 16 illustrates a non-limiting example block diagram of a system 1600 of a mobile network platform 1610 which can provide content management service in accordance with aspects described herein.

In the mobile 1405 of FIG. 14, which can be a multimode access terminal, a set of antennas $1409_1$-$1409_Q$ (Q is a positive integer) can receive and transmit signal(s) from and to wireless devices like access points, access terminals, wireless ports and routers, and so forth that operate in a radio access network. It should be appreciated that antennas $1409_1$-$1409_Q$ are a part of communication platform 1410, which comprises electronic components and associated circuitry that provide for processing and manipulation of received signal(s) and signal(s) to be transmitted; e.g., receivers and transmitters 1412, mux/demux component 1414, and mod/demod component 1416.

In the system 1400, multimode operation chipset(s) 1420 allows mobile 1405 to operate in multiple communication modes in accordance with disparate technical specification for wireless technologies. In an aspect, multimode operation chipset(s) 1420 utilizes communication platform 1410 in accordance with a specific mode of operation (e.g., voice, Global Positioning System (GPS)). In another aspect, multimode operation chipset(s) 1420 can be scheduled to operate concurrently (e.g., when Q>1) in various modes or within a multitask paradigm.

Mobile 1405 includes botnet mitigation component 1422 and can convey content(s) or signaling in accordance with aspects described herein. It should be appreciated that botnet mitigation component 1422, can include a display interface that renders content in accordance with aspects of an user prompt component (not shown) that resides within botnet mitigation component 1422.

Mobile 1405 also includes a processor 1435 configured to confer functionality, at least in part, to substantially any electronic component within mobile 1405, in accordance with aspects described herein. As an example, processor 1435 can be configured to execute, at least in part, instructions in multimode operation chipset(s) that afford multimode communication through mobile 1405 such as concurrent or multitask operations of two or more chipset(s). As another example, processor 1435 can facilitate mobile 1405 to receive and convey signaling and content(s) (e.g., various data flows) that are part of an active management act initiated by a subscriber that operates mobile 1405, or an approval cycle associated with auxiliary subscribers (e.g., secondary subscriber, tertiary subscriber . . . ). Moreover, processor 1435 facilitates mobile 1405 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1455 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In the system 1400, processor 1435 is functionally coupled (e.g., through a memory bus) to memory 1455 in order to store and retrieve information necessary to operate and/or confer functionality, at least in part, to communication platform 1410, multimode operation chipset(s) 1420, botnet mitigation component 1422, and substantially any other operational aspects of multimode mobile 1405.

FIG. 15 is a block diagram of an example system 1500 of a non-mobile device that can convey content(s) exploit various aspects of content transaction(s) as described herein. Device 1505 includes a functional platform 1510 that comprises a set of components (not shown) that provide, at least in part, one or more specific functionalities of the non-mobile device 1505. Additionally, non-mobile device 1505 includes an botnet mitigation component 1525 that operates in accordance with aspects described herein before. Moreover, in an aspect, non-mobile device 1505 can include a communication platform 1530 that can provide wireless communication capabilities in addition, or alternatively, to connectivity of non-mobile device 1505 through wired links (e.g., Ethernet, USB, GPIB, RS-232, FireWire, optical or coaxial cable connection to a network interface such as network interface, or router (not shown)). With respect to wireless capability, in non-mobile device 1505, which can be a multimode access terminal, a set of antennas $1537_1$-$1537_P$ (P is a positive integer) can receive and transmit signal(s) from and to wireless devices like access points, access terminals, wireless ports and routers, etc., that operate in a radio access network. Communication platform 1530 can exploit the set of P antennas $1537_1$-$1537_K$, (K is a positive integer) to establish communication within various modes such as single-input single-output, or multiple-input multiple output.

Additionally, in non-mobile device 1505, a peripheral platform 1540 can include, or facilitate connection to, additional devices such as printer(s), media player(s), wireless router(s) (e.g., network interface), biometrics touch-pad(s), etc. In an aspect, to afford such connectivity, peripheral platform 1540 can include jacks for one or more of Ethernet, USB, GPIB, RS-232, FireWire, optical or coaxial cable connectors. Additionally, display interface 1545 can be a part of functional platform 1510 (e.g., when non-mobile device 1505 is a PC, an IPTV interface, a mobile, a back projector component, a data projector . . . ). In an aspect, display interface 1545 can be a liquid crystal display (LCD), a plasma panel, a monolithic thin-film based electro-chromic display, and so on. It should be appreciated that rendering areas in display interface 1545 can be substantially disparate.

It should be appreciated that non-mobile device 1505 also can include a data entry interface 1550 that can allow an end user to perform at least one of (i) command non-mobile device via configuration of functional platform 1510, (ii) deliver content(s) or signaling directed in accordance to aspects described herein, or (iii) generate content(s) (e.g., images via a built-in camera) or directive(s) for subscribed content.

Power supply 1575 can power-up device 1505 and substantially any component included thereon. It should be appreciated that alternative or additional embodiments of device 1505 may not include power supply 1575 and be powered via an attachment to a conventional power grid.

In the system 1500, non-mobile device 1505 includes processor 1585 which can be functionally coupled (e.g., through a memory bus) to memory 1595 in order to store and retrieve information to operate and/or confer functionality, at least in part, to botnet mitigation component 1525, and substantially any component(s) thereon in accordance with aspects described herein; functional platform 1510; communication platform 1530 and substantially any other component of non-mobile device 1505. With respect to botnet mitigation component 1525, and components thereon, processor 1585 can be configured to execute access protocols to convey credentials and gains access to a content management service to convey multimedia content(s) or signaling to a subscribed WDMF. In addition, in connection with communication platform 1530, processor 1585 is configured to confer functionality, at least in part, to substantially any electronic component within communication platform 1530. Moreover, processor 1585 facilitates communication platform 1530 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1595 also can retain multimedia content(s) or security credentials (e.g., passwords, encryption keys, digital certificates) that facilitate access to a content management service. In addition, memory 1595 can store data structures (e.g., metadata); code structure(s) (e.g., modules, objects, classes, procedures) or instructions, or substantially any type of software or firmware that processor 1585 can execute to provide functionality associated with functional platform 1510; network or device information like policies and specifications; code sequences for scrambling, spreading and pilot (e.g., reference signal(s)) transmission; and so on.

FIG. 16 illustrates a block diagram 1600 of a mobile network platform 1610 which can provide a botnet mitigation in accordance with aspects described herein. Generally, mobile network platform 1610 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect, as described above, component within PS domain of network platform 1610 can be employed to effect communication in accordance with aspects described herein.

With respect to CS communication, mobile network platform 1610 includes CS gateway node(s) 1612 which can interface CS traffic received from legacy networks such as telephony network(s) 1614 (e.g., public switched telephone network (PSTN), or public land mobile network (PLMN)) or a SS7 network 1616. Circuit switched gateway node(s) 1612 can authorize and authenticate traffic (e.g., voice) arising from such networks. Additionally, CS gateway node(s) 1612 can access mobility, or roaming, data generated through SS7 network 1616; for instance, mobility data stored in a visitation location register (VLR), which can reside in memory 1620. Moreover, CS gateway node(s) 1612 interfaces CS-based traffic and signaling and gateway node(s) 1622. As an example, in a 3GPP UMTS network, CS gateway node(s) 1612 can be embodied, at least in part, in gateway GPRS support node(s) (GGSN).

In addition to receiving and processing CS-switched traffic (e.g., content(s) that can be part of a content(s) transmitted by a service provider) and signaling, PS gateway node(s) 1622 can authorize and authenticate PS-based data sessions with served mobile devices, non-mobile devices, and access points. Data sessions can include traffic, or content(s), exchange with networks external to the mobile network platform 1610, such as wide area network(s) (WANs) 1630 or service network(s) 1640; it should be appreciated that local area network(s) (LANs) 1650 can also be interfaced with mobile network platform 1610 through PS gateway node(s) 1622. Packet-switched gateway node(s) 1622 generates packet data contexts when a data session is established. To that end, in an aspect, PS gateway node(s) 1622 can include a tunnel interface (e.g., tunnel termination gateway (TTG) in 3GPP UMTS network(s) (not shown)) which can facilitate packetized communication with disparate wireless network(s), such as network platform and associated radio access network, Wi-Fi networks. It should be further appreciated that the packetized communication can include multiple flows that can be generated through service (e.g., provisioning) and application server(s) 1660. It is to be noted that in 3GPP UMTS network(s), PS gateway node(s) 1622 (e.g., GGSN) and tunnel interface (e.g., TTG) comprise a packet data gateway (PDG).

The mobile network platform 1610 also includes serving node(s) 1670 that convey the various packetized flows of data streams (e.g., content(s) or signaling directed to a subscribed data), received through PS gateway node(s) 1622. As an example, in a 3GPP UMTS network, serving node(s) 1670 can be embodied in serving GPRS support node(s) (SGSN).

Server(s) 1660 in mobile network platform 1610 can execute numerous applications (e.g., location services, online gaming, wireless banking, wireless device management . . . ) that can generate multiple disparate packetized data streams or flows, and manage (e.g., schedule, queue, format . . . ) such flows. Such application(s), for example can include add-on features to standard services provided by mobile network platform 1610. Data streams (e.g., content(s) or signaling directed to a file) can be conveyed to PS gateway node(s) 1622 for authorization/authentication and initiation of a data session, and to serving node(s) 1670 for communication thereafter.

Server(s) 1660 can also effect security (e.g., implement one or more firewalls) of mobile network platform 1610 to ensure network's operation and data integrity in addition to authorization and authentication procedures that CS gateway node(s) 1612 and PS gateway node(s) 1622 can enact. Moreover, server(s) 1660 can provision services from external network(s), e.g., WAN 1630, or Global Positioning System (GPS) network(s) (not shown). It is to be noted that server(s) 1660 can include one or more processors configured to confer at least in part the functionality of macro network platform 1610. To that end, the one or more processor can execute code instructions stored in memory 1620, for example.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, et cetera), optical disks (e.g., compact disk (CD), digital versatile disk (DVD), et cetera), smart cards, and flash memory devices (e.g., card, stick, key drive, et cetera). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used herein, the term "identifying information" is intended to be contact information known at the time a communication is connected relating to a party of the communication and can include (but is not limited to) telephone numbers, aliases, messenger names and identifiers, e-mail addresses, extensions, device personal identification numbers (PINs), distribution lists, network addresses, component addresses (e.g., medium access control (MAC) addresses, machine addresses, et cetera) or other component identifiers, user names, nicknames, domains, signatures (electronic, physical, and otherwise), references, forwarding configurations, and network addresses. The term "communication" as used when two or more devices correspond is intended to expansively capture all means of transmission or reception available to state-of-the-art devices and can include (but is not limited to) cellular, satellite transmission, VOIP and SIP voice connections, short message service (SMS) exchanges, broadcast data, network sessions, e-mails, instant messages, other network-based messaging, PIN or other device-based messaging, voicemail, picture mail, video mail, mixed-content correspondence, Unified Messaging (UM), and other digital and analog information transmitted between parties in any local and/or distant, physical and/or logical region.

Similarly, the concept of "data transmission" herein is intended to broadly represent known means of information exchange with digital or analog systems, including but not limited to hard-wired and direct connections (e.g., local media, universal serial bus (USB) cable, integrated drive electronics (IDE) cable, category 5 cable, coaxial cable, fiber optic cable and telephone cable), shared connections (e.g., remote and/or distributed resources) wireless connections (e.g., Wi-Fi, Bluetooth, infrared wireless, and personal area network connections), messaging systems (e.g., short message service (SMS), instant messaging, and other network-enabled other messaging), mobile or cellular transmissions and combinations thereof (e.g., personal communication system (PCS) and integrated networks), Unified Messaging, and other means of techniques of communication employed by telephones, personal digital assistants (PDAs), computers and network devices. "Mixed-content message," as used herein, is intended to represent communications employing one or more means of data transmission to present one or more varieties of device-capable content, including (but not limited to) picture messages, audio or video messages, and messages where text or other media types accompany one another. A "user device" can include, but is not limited to, data-enabled telephones (cellular telephones, smart phones, soft phones, VOIP and SIP phones, satellite phones, telephones coupled to computer systems, et cetera), communications receivers, personal digital assistants, pagers, portable e-mail devices, portable web browsers, media devices capable of receiving data, portable computers, and other electronics that allow a user to receive communications from other parties.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise historic data on previously served queries; communication party information from various sources; files and applications; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of aspects of the claimed subject matter. It is, of course, not possible to describe every conceivable combination of components or methods for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim. Embodiments and examples provided in the foregoing are non-exhaustive and understood to capture similar functionality known as of the disclosures herein.

What is claimed is:

1. A method, comprising:
based on analyzing traffic flow data associated with a mobile communication device of a cellular network, determining, by an access point device comprising a processor, that operation of the mobile communication device satisfies a defined condition representing an anomalistic communication between the mobile communication device and a bot network device of a bot network;
receiving, by the access point device, location data indicative of a geographical location of the mobile communication device, wherein the receiving comprises receiving the location data from a gateway node device of the cellular network; and
based on the location data, directing, by the access point device, traffic profile data representing the anomalistic communication to the mobile communication device to facilitate removal of defined malicious application data from a data store of the mobile communication device.

2. The method of claim 1, wherein the analyzing comprises comparing the traffic flow data with defined bot behavior data.

3. The method of claim 2, wherein the comparing comprises matching the traffic flow data with information indicative of a set of defined bot traffic patterns.

4. The method of claim 1, wherein the analyzing comprises determining that the mobile communication device is transmitting data to a specified internet relay chat port.

5. The method of claim 1, wherein the determining comprises determining that the mobile communication device is likely to be a peer network bot device of a peer-to-peer bot network.

6. The method of claim 1, wherein the directing comprises directing the traffic profile data via a route that is determined based on the location data.

7. The method of claim 1, wherein the determining comprises determining that the mobile communication device is likely to be the bot network device based on a cluster analysis that determines a group of bot network devices that satisfy a botnet communication criterion.

8. A computer-readable storage device comprising executable instructions that, in response to execution, cause an access point device comprising a processor to perform operations, comprising:
receiving identifier data indicative of a mobile communication device that is likely to be part of a bot network, wherein the identifier data is determined based on monitoring data flow data of a cellular network corresponding to the mobile communication device;
receiving, from a gateway node device of the cellular network, location data indicative of a geographical location of the mobile communication device; and
based on the location data, directing, to the mobile communication device, traffic profile data that is indicative of an anomalistic communication between the mobile communication device and a network device of the network devices to facilitate a determination, by the mobile communication device, that application data stored in a data store of the mobile communication device is malicious.

9. The computer-readable storage device of claim 8, wherein the operations further comprise:
based the location data, determining route data associated with a route via which the traffic profile data is to be directed to the mobile communication device.

10. The computer-readable storage device of claim 9, wherein the receiving the identifier data comprises receiving internet protocol address data indicative if an internet protocol address assigned to the mobile communication device.

11. The computer-readable storage device of claim 8, wherein the operations further comprise:
directing, to the mobile communication device, warning data that facilitates a presentation of a warning message via the mobile communication device.

12. The computer-readable storage device of claim 11, wherein the warning message is indicative of a request for an authorization to delete the application data determined to be malicious.

13. The computer-readable storage device of claim 8, wherein the receiving the identifier data comprises receiving the identifier data of the mobile communication device that has been determined to have transferred data to a specified internet relay chat port.

14. The computer-readable storage device of claim 8, wherein the receiving the identifier data comprises receiving the identifier data of the mobile communication device that has been determined to have communicated with a specified command and control server.

15. The computer-readable storage device of claim 8, wherein the bot network comprises a bot network device that communicates with other bot network devices of the bot network according to a peer-to-peer communication protocol.

16. A mobile communication device, comprising:
a memory that stores executable instructions; and
a processor, coupled to the memory, that facilitates execution of the executable instructions to perform operations, comprising:
based on location data indicative of a geographical location of the mobile communication device that has been transmitted from a network gateway device to an access point device of a cellular network, receiving, from the access point device, traffic profile data indicative of an anomalistic data traffic flow criterion with respect to an anomalistic communication between the mobile communication device and a bot network device associated with a bot network, in response to the receiving, monitoring a communication of the mobile communication device; and in response to determining that the communication satisfies the anomalistic data traffic flow criterion with respect to the anomalistic communication between the mobile communication device and the bot network device, determining that an application of the mobile communication device associated with the anomalistic communication comprises malware.

17. The mobile communication device of claim 16, wherein the operations further comprise:

in response to the determining that the application comprises the malware, facilitating a presentation of request data via an interface of the mobile communication device, wherein the request data is indicative of a request for an authorization to delete the application.

18. The mobile communication device of claim 17, wherein the operations further comprise:

in response to receiving authorization data indicative of the authorization, uninstalling the application.

19. The mobile communication device of claim 17, wherein the operations further comprise:

in response to determining that the authorization is denied, facilitating dropping of data packets associated with the application.

20. The mobile communication device of claim 16, wherein the operations further comprise:

in response to the determining that the application comprises the malware, prohibiting access of the application via the mobile communication device.

* * * * *